US011788855B2

(12) United States Patent
Rasmusson et al.

(10) Patent No.: US 11,788,855 B2
(45) Date of Patent: *Oct. 17, 2023

(54) EVALUATING AND PRESENTING PICK-UP AND DROP-OFF LOCATIONS IN A SITUATIONAL AWARENESS VIEW OF AN AUTONOMOUS VEHICLE

(71) Applicant: Lyft, Inc., San Francisco, CA (US)

(72) Inventors: Robert Earl Rasmusson, San Francisco, CA (US); Taggart Matthiesen, Kentfield, CA (US); Craig Dehner, San Francisco, CA (US); Linda Dong, San Francisco, CA (US); Frank Taehyun Yoo, San Carlos, CA (US); Karina van Schaardenburg, San Francisco, CA (US); John Tighe, San Francisco, CA (US); Matt Vitelli, San Francisco, CA (US); Jisi Guo, San Francisco, CA (US); Eli Guerron, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 323 days.

This patent is subject to a terminal disclaimer.

(21) Appl. No.: 17/012,648

(22) Filed: Sep. 4, 2020

(65) Prior Publication Data

US 2021/0056320 A1 Feb. 25, 2021

Related U.S. Application Data

(63) Continuation of application No. 15/812,749, filed on Nov. 14, 2017, now Pat. No. 10,769,452.

(Continued)

(51) Int. Cl.
*G01C 22/00* (2006.01)
*G01C 21/36* (2006.01)
(Continued)

(52) U.S. Cl.
CPC ..... *G01C 21/3638* (2013.01); *B62D 15/0285* (2013.01); *G01C 21/365* (2013.01);
(Continued)

(58) Field of Classification Search
CPC ............. G06K 9/00791; G06K 9/6267; G05D 1/0044; G05D 1/0212; G05D 1/0274;
(Continued)

(56) References Cited

U.S. PATENT DOCUMENTS 9,823,081 B2 * 11/2017 Crawford ............... G01C 21/34
10,769,452 B2 * 9/2020 Rasmusson, Jr. .... G05D 1/0246
(Continued)

*Primary Examiner* — Shardul D Patel
(74) *Attorney, Agent, or Firm* — Baker Botts L.L.P.

(57) ABSTRACT

In one embodiment, a method includes sending a set of instructions to present, on a computing device, one or more available locations for a vehicle to pick-up or drop-off a user in an area. The one or more available locations are based on sensor data of the area that is captured by the vehicle. The method includes receiving a user selection to select a location associated with the area for the vehicle to pick-up or drop-off the user. The method includes adjusting a viability value of one or more locations to pick-up or drop-off the user. The viability value is adjusted based at least on the selected location. The method includes, based on the adjusted viability value of the one or more locations, determining a location from the one or more locations. The method includes instructing the vehicle to travel to the determined location.

20 Claims, 6 Drawing Sheets

Related U.S. Application Data

(60) Provisional application No. 62/422,025, filed on Nov. 14, 2016.

(51) Int. Cl.
  *G05D 1/02* (2020.01)
  *G05D 1/00* (2006.01)
  *G06T 7/20* (2017.01)
  *G06V 20/56* (2022.01)
  *G06F 18/24* (2023.01)
  *B62D 15/02* (2006.01)

(52) U.S. Cl.
  CPC ......... *G05D 1/0044* (2013.01); *G05D 1/0088* (2013.01); *G05D 1/0212* (2013.01); *G05D 1/0246* (2013.01); *G05D 1/0274* (2013.01); *G06F 18/24* (2023.01); *G06T 7/20* (2013.01); *G06V 20/56* (2022.01); *B60W 2554/00* (2020.02); *G05D 2201/0212* (2013.01); *G05D 2201/0213* (2013.01); *G06T 2207/30252* (2013.01); *G06T 2207/30256* (2013.01); *G06T 2207/30261* (2013.01)

(58) Field of Classification Search
  CPC ............... G05D 1/0246; G05D 1/0088; G05D 2201/0212; G05D 2201/0213; B62D 15/0285; G01C 21/365; G01C 21/3638; G01C 22/00; G06T 7/20; G06T 2207/30252; G06T 2207/30261; G06T 2207/30256; B60W 2550/20
  USPC ........................................................... 701/23
  See application file for complete search history.

(56) References Cited

U.S. PATENT DOCUMENTS

| | | | |
|---|---|---|---|
| 2001/0056363 A1* | 12/2001 | Gantz | G06Q 30/02 705/13 |
| 2010/0169199 A1* | 7/2010 | Fuller | G06Q 10/08 715/810 |
| 2015/0161564 A1* | 6/2015 | Sweeney | G06Q 50/30 705/338 |
| 2015/0179080 A1* | 6/2015 | Kennerly | G09B 5/02 434/236 |
| 2015/0377635 A1* | 12/2015 | Beaurepaire | G05D 1/021 701/408 |
| 2016/0370194 A1* | 12/2016 | Colijn | G08G 1/205 |
| 2017/0123421 A1* | 5/2017 | Kentley | G05D 1/0297 |
| 2017/0124476 A1* | 5/2017 | Levinson | G06V 20/58 |
| 2017/0138749 A1* | 5/2017 | Pan | G01C 21/3438 |
| 2017/0153714 A1* | 6/2017 | Gao | G06V 10/143 |
| 2017/0267233 A1* | 9/2017 | Minster | G06Q 10/02 |
| 2017/0316533 A1* | 11/2017 | Goldman-Shenhar | H04L 67/306 |
| 2017/0344010 A1* | 11/2017 | Rander | G06Q 10/06311 |
| 2018/0001870 A1* | 1/2018 | Herman | G01C 21/3676 |

* cited by examiner

> US 11,788,855 B2

EVALUATING AND PRESENTING PICK-UP AND DROP-OFF LOCATIONS IN A SITUATIONAL AWARENESS VIEW OF AN AUTONOMOUS VEHICLE

PRIORITY

This application is a continuation under 35 U.S.C. § 120 of U.S. patent application Ser. No. 15/812,749, filed 14 Nov. 2017, which claims the benefit, under 35 U.S.C. § 119(e), of U.S. Provisional Patent Application No. 62/422,025, filed 14 Nov. 2016, which is hereby incorporated by reference in its entirety and for all purposes.

BACKGROUND

Traditionally, transportation and related services have been provided by a human-operated vehicle. Improvements to computer technology have led to increasing efforts to automate these services, using autonomous vehicles that do not require a human operator. However, riders are accustomed to interacting directly with human drivers to provide information or instructions in addition to the information exchanged in an application for a dynamic transportation matching system. Because the autonomous vehicle lacks a human driver, it may be difficult for passengers to communicate information to the vehicle or receive information from the vehicle. This may undermine the user experience and dissuade potential users from taking rides in autonomous vehicles.

DESCRIPTION OF EXAMPLE EMBODIMENTS

Figure 1:
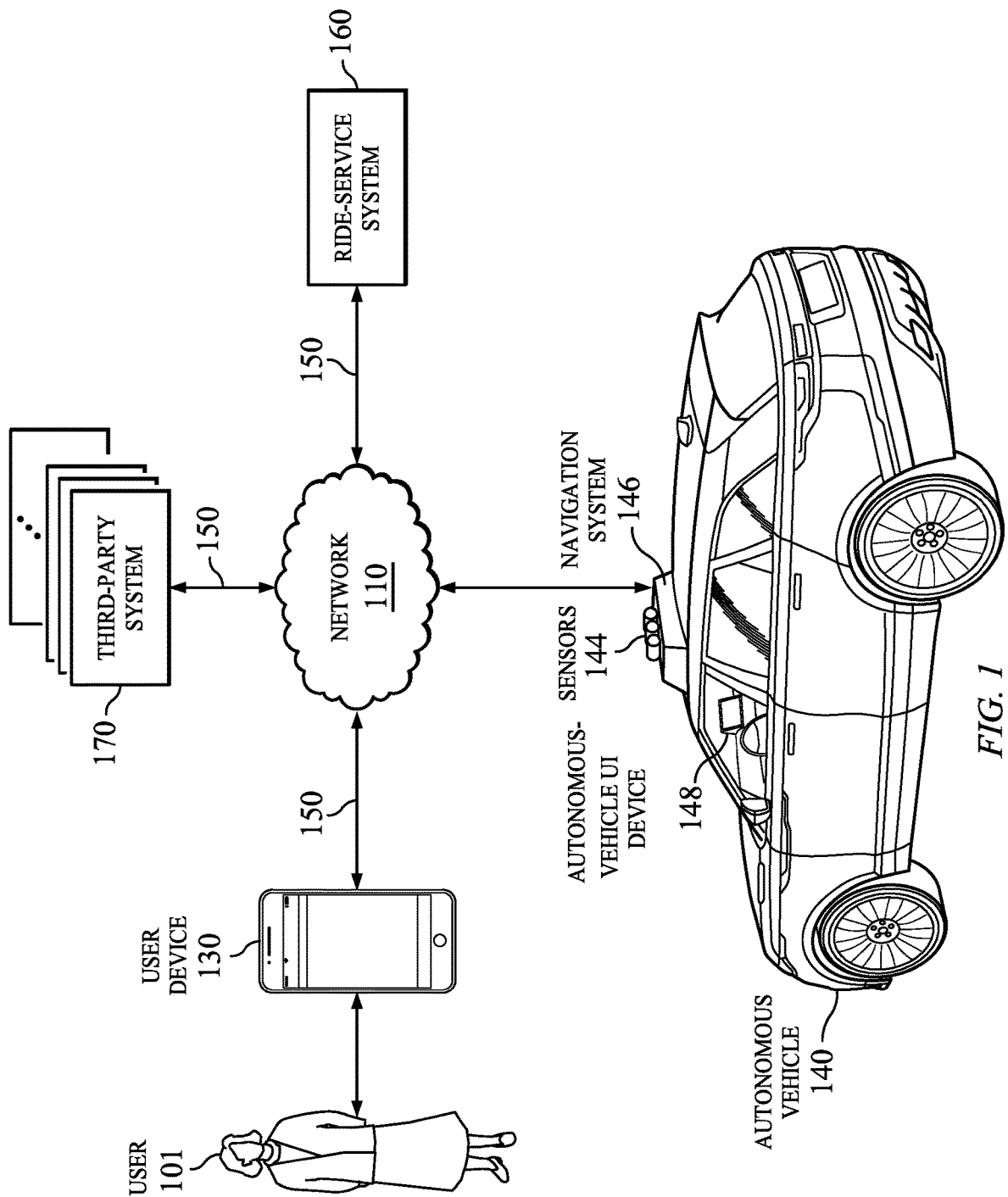
FIG. 1 illustrates an example network environment associated with a dynamic transportation matching system.

Traditional transportation services like taxis and ride-sharing applications involve a human driver providing transportation to a passenger. Passengers have generally been able to communicate freely with their drivers, providing drivers information about which roads to take, where to stop for drop-off, or to provide correction if the driver is going in the wrong direction. For example, at the end of a ride, the passenger may tell the driver, "Drop me off at the third house on the left." The driver may then proceed to the specified location and drop off the passenger. However, in an autonomous vehicle there is no human driver. The passenger may not be able to simply tell the autonomous vehicle "Drop me off at the third house on the left." Without some way to interact with the autonomous vehicle, it may be difficult or impossible for the autonomous vehicle to understand and navigate to a passenger's desired pick-up or drop-off location.

To further illustrate the issues that may arise with autonomous driving, consider the following scenario. A user may begin a ride with autonomous vehicle and set her destination as 185 Berry Street. This location may be the address of a building in San Francisco, Calif. The building may span 150 feet on a particular block. The autonomous vehicle should select a drop-off location for this rider that is reasonably close to where the passenger wants to be dropped off. Simply using the address as the drop-off location may result in an inconvenient or unsafe drop-off. This may be because the address is 150 feet long and cars or other obstacles may be blocking part or all of the road adjacent to the building (or location) designated by that address.

To overcome this problem, the autonomous vehicle may use sensor data and take many factors into consideration when determining an appropriate pick-up or drop-off location, as well as allow passengers to communicate with the autonomous vehicle through an autonomous-vehicle user interface (UI) device. This may be done by (1) identifying, based on map data, an area for pick-up or drop-off of the passenger (e.g., based on the origin or destination coordinates or address); (2) determining, based on autonomous-vehicle sensor data, one or more potential pick-up or drop-off locations within the area; (3) calculating, based at least in part on the autonomous-vehicle sensor data and historical data, a viability score for each of the potential pick-up or drop-off locations; and (4) providing for display in, e.g., a situational awareness view, a visual representation of at least a portion of the area for pick-up or drop-off that indicates at least one of the potential pick-up or drop-off locations. Thus, instead of talking to a human driver, the passenger may use the autonomous-vehicle UI device to communicate with the autonomous vehicle. The autonomous-vehicle UI device may display the situational-awareness view, which includes a representation of the environment surrounding the autonomous vehicle. A situational-awareness view is a graphical representation of an external environment of the autonomous vehicle that is updated in real time. The situational-awareness view may also be displayed on the passenger's own computing device in addition to or instead of the autonomous-vehicle UI device.

The situational-awareness view may include graphical representations of nearby objects such as cars, pedestrians, and traffic signals and may assist the passenger in each phase of a given ride: before the ride, during the ride, and at the end of the ride. Before the ride, while the autonomous vehicle is en route to pick-up a requestor (i.e., a user who has requested a ride), the requestor's device may display a situational-awareness view that includes one or more potential pick-up locations. The requestor may designate a desired pick-up location by tapping a location of her screen that corresponds to the desired pick-up location. During the ride, the user may view the situational-awareness view and see all the things that the autonomous vehicle perceives (e.g., cars, pedestrians, traffic signals). This may bolster the passenger's confidence that the autonomous vehicle is aware of its surroundings and is navigating along the proper path. Finally, as the ride nears completion, the situational-awareness view may display graphical representations of potential drop-off locations that are overlain on the situational-awareness view. The passenger may designate a desired drop-off location by tapping a location of the screen that corresponds to the desired drop-off location. The interaction with the autonomous-vehicle UI device and the situational-awareness view may give the user more control over the autonomous vehicle. Accordingly, the situational-awareness view enhances the user experience by personalizing the user's ride and by giving the user confidence in the autonomous vehicle system's ability to navigate to desired locations with a high degree of accuracy. Further, the situational-awareness view provides an intuitive and interactive interface for users to understand the environment surrounding the autonomous vehicle, the world as the autonomous-vehicle understands it, and to interface and interact with the autonomous vehicle to ensure a successful ride.

Related U.S. patent application Ser. No. 15/812,645, entitled "Identifying Objects for Display in a Situational-Awareness View of an Autonomous-Vehicle Environment," filed 14 Nov. 2017, and U.S. patent application Ser. No. 15/812,636, entitled "Rendering a Situational Awareness View in an Autonomous-Vehicle Environment," filed 14 Nov. 2017, are both related to subject matter similar to the subject matter disclosed herein. Both applications are hereby incorporated by reference in their entirety and for all purposes.

FIG. 1 illustrates an example network environment 100 associated with a dynamic transportation matching system. Network environment 100 includes a user 101, a user device 130, a dynamic transportation matching system 160, an autonomous vehicle 140, and one or more third-party system 170 connected to each other by a network 110. Although FIG. 1 illustrates a particular arrangement of user 101, user device 130, dynamic transportation matching system 160, autonomous vehicle 140, third-party system 170, and network 110, this disclosure contemplates any suitable arrangement of user 101, user device 130, dynamic transportation matching system 160, autonomous vehicle 140, third-party system 170, and network 110. As an example and not by way of limitation, two or more of user device 130, dynamic transportation matching system 160, autonomous vehicle 140, and third-party system 170 may be connected to each other directly, bypassing network 110. As another example, two or more of user device 130, dynamic transportation matching system 160, autonomous vehicle 140, and third-party system 170 may be physically or logically co-located with each other in whole or in part. Moreover, although FIG. 1 illustrates a particular number of users 101, user devices 130, dynamic transportation matching systems 160, autonomous vehicles 140, third-party systems 170, and networks 110, this disclosure contemplates any suitable number of users 101, user devices 130, dynamic transportation matching systems 160, autonomous vehicles 140, third-party systems 170, and networks 110. As an example and not by way of limitation, network environment 100 may include multiple users 101, user devices 130, dynamic transportation matching systems 160, autonomous-vehicles 140, third-party systems 170, and networks 110.

In particular embodiments, dynamic transportation matching system 160 may facilitate transportation for one or more users 101. Dynamic transportation matching system 160 may receive any number of ride requests from any number of users 101. When dynamic transportation matching system 160 receives a ride request, it may also receive an identifier from a user device 130 associated with user 101. The identifier may identify user 101 to dynamic transportation matching system 160 for the purpose of accessing rider information about user 101 in accordance with the rider's privacy settings. Rider information may be stored on one or more data stores associated by dynamic transportation matching system 160. In particular embodiments, rider information may include information about a particular rider or information about riders in the aggregate. Such information may include preferred pick-up or drop-off locations for a particular rider or for a threshold number of riders, one or more autonomous-vehicle settings of the rider or riders (such as preferred speed, preferred rates of acceleration/deceleration, preferred following distance when travelling at various speeds, etc.), music settings (e.g. preferred playlists, volume, etc.), frequent destinations for a particular rider, payment information, or any other suitable information. Dynamic transportation matching system 160 may also store and access ride information. Ride information may include locations related to the ride, traffic data, alternate routes, optimal pick-up or drop-off locations for the ride, or any other suitable data. As an example and not by way of limitation, dynamic transportation matching system 160 may access information related to rides travelling from San Francisco International Airport (SFO) to Palo Alto, Calif. This information may include preferred pick-up locations at SFO for a threshold number of users, alternate pick-up locations in the event that a pick-up location is unavailable, one or more routes to navigate from SFO to Palo Alto, preferred off-ramps for a threshold number of users, or any other suitable information. Ride information and rider information may collectively be referred to as historical data or historical ride-service data. Historical data may be specific to a single user or may include data for many users. If the historical data is specific to a single user it may include information about past rides that particular user has taken, including the locations at which the user is picked up and dropped off, the music the user likes to listen to, the traffic information associated with the rides, time of the day the user most often rides, and any other suitable information.

In particular embodiments, dynamic transportation matching system 160 may include one or more servers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, dynamic transportation matching system 160 may include one or more data stores. The data stores may be used to store various types of information, such as ride information, rider information, or any other suitable type of information. In particular embodiments, the information stored in the data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a user device 130, a dynamic transportation matching system 160, autonomous-vehicle system 140, or a third-party system 170 to manage, retrieve, modify, add, or delete, the information stored in data store 164.

In particular embodiments, user device 130 may be a mobile computing device such as a smartphone, tablet computer, or laptop computer. User device 130 may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or ride-service applications. With ride-service applications, users may connect to a dynamic transportation matching system to request rides to travel from one location to another.

In particular embodiments, autonomous vehicle 140 may be equipped with an array of sensors 144, a navigation system 146, and an autonomous-vehicle UI device 148. Autonomous vehicle 140 may be in the full control of dynamic transportation matching system 160, or it may be owned by a third party (e.g. a person or other entity). If owned by a third party, the third party may lend the autonomous vehicle for limited amounts of time to the dynamic transportation matching system 160 for the purpose of providing rides to users. While the autonomous vehicle is being operated by dynamic transportation matching system 160, the autonomous vehicle may share data (e.g. sensor data, navigation data) with dynamic transportation matching system 160. Autonomous-vehicle sensor data may be captured by any suitable sensor arrangement, such as a Light Detection and Ranging (LiDAR) sensor array of multiple LiDAR transceivers that are configured to rotate 360° around the autonomous vehicle. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary.

The autonomous-vehicle sensor data may represent a three-dimensional schema of the external environment of the autonomous vehicle. As an example and not by way of limitation, the three-dimensional schema may represent the external environment including objects such as other cars and pedestrians up to a maximum range of the sensor arrangement (e.g., 100 meters). In particular embodiments, at least some of the autonomous-vehicle sensor data may be classified to include references to objects that are within a threshold distance from the autonomous vehicle.

Although sensor array 144 appears in a particular location on autonomous vehicle 140 in FIG. 1, sensor array 144 may be located in any suitable location in or on autonomous vehicle 140. Example locations for sensors include the front and rear bumpers, the doors, the front windshield, on the side paneling, or any other suitable location. In particular embodiments, navigation system 146 may be any suitable autonomous navigation system, such as a navigation system based at least in part on a Global Positioning System (GPS) module, inertial measurement unit (IMU), LIDAR sensors, optical cameras, radio frequency (RF) transceivers, or any other suitable data gathering mechanism. Navigation system 146 may use map data and autonomous-vehicle sensor data to guide the autonomous vehicle to its destinations without colliding into other objects. Although navigation system 146 appears in a particular location on autonomous vehicle 140 in FIG. 1, navigation system 146 may be located in any suitable location in or on autonomous vehicle 140. Example locations for navigation system 146 include inside the cabin of autonomous vehicle 140, near the engine/battery, near the front seats, rear seats, or in any other suitable location. Although this disclosure describes a particular autonomous vehicle having a particular set of features (e.g. sensors, navigation system, dynamic transportation matching system computing device), this disclosure contemplates any suitable autonomous vehicle having any suitable set of features.

In particular embodiments, autonomous-vehicle user interface (UI) device 148 may be a tablet or other suitable device associated with dynamic transportation matching system 160 to allow the user to interact with the autonomous vehicle 140, dynamic transportation matching system 160, other users 101, or a third-party 170. In particular embodiments, an autonomous-vehicle UI device may be any suitable computing device such as a tablet, and may be associated with dynamic transportation matching system 160. For example, the autonomous-vehicle UI device 148 may have a software application associated with dynamic transportation matching system 160 installed on the device 148. Although a single autonomous-vehicle UI device 148 is illustrated in a particular location in autonomous vehicle 140 of FIG. 1, autonomous vehicle 140 may include several autonomous-vehicle UI devices 148 in several different locations within the vehicle. As an example and not by way of limitation, autonomous vehicle 140 may include four autonomous-vehicle UI devices 148 located in front of the front-left passenger seat (e.g. driver's seat in traditional U.S. automobiles), in front of the front-right passenger seat, in front of the rear-left passenger seat, and in front of the rear-right passenger seat. In particular embodiments, autonomous-vehicle UI device 148 may be detachable from any component of autonomous vehicle 140. This may allow users to handle autonomous-vehicle UI device 148 in a manner consistent with other tablet computing devices. As an example and not by way of limitation, a user may move autonomous-vehicle UI device 148 to any location in the cabin of autonomous vehicle 140, may hold autonomous-vehicle UI device 148 in their lap, or handle autonomous-vehicle UI device 148 in any other suitable manner.

In particular embodiments, autonomous-vehicle UI device 148 may include a display screen that is configured to display a situational-awareness view of a current environment of autonomous vehicle 140. In particular embodiments, the situational-awareness view may be presented by a projector that projects the situational-awareness view onto one or more surfaces in the autonomous vehicle 140. Surfaces may include, for example, a front windshield or side windows. In some embodiments, the projection may operate similarly to a heads-up display, where the images are perceived as holograms.

Figure 3:
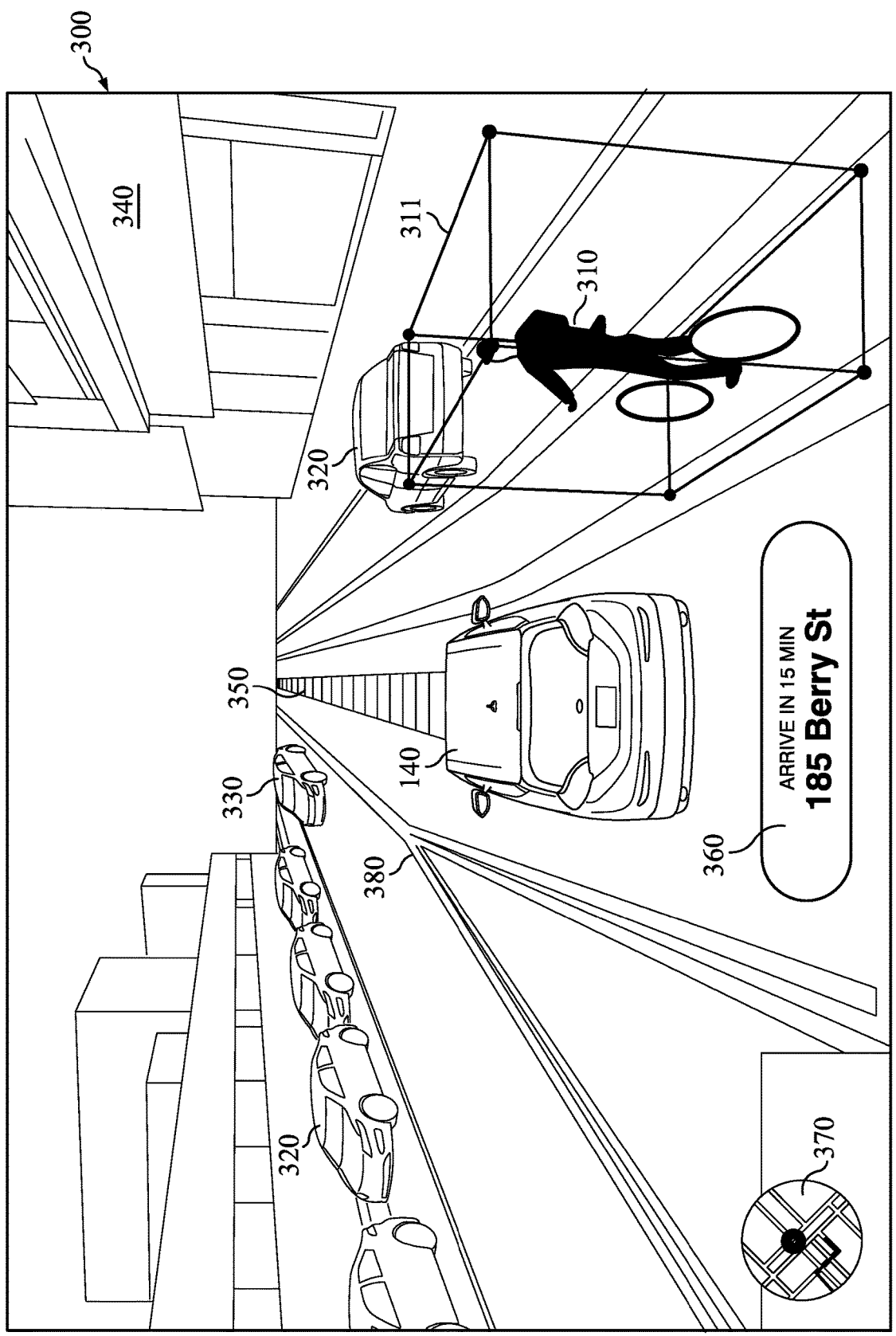
FIG. 3 illustrates an example graphical interface for displaying a real-time situational-awareness view associated with an autonomous ride.
Figure 4:
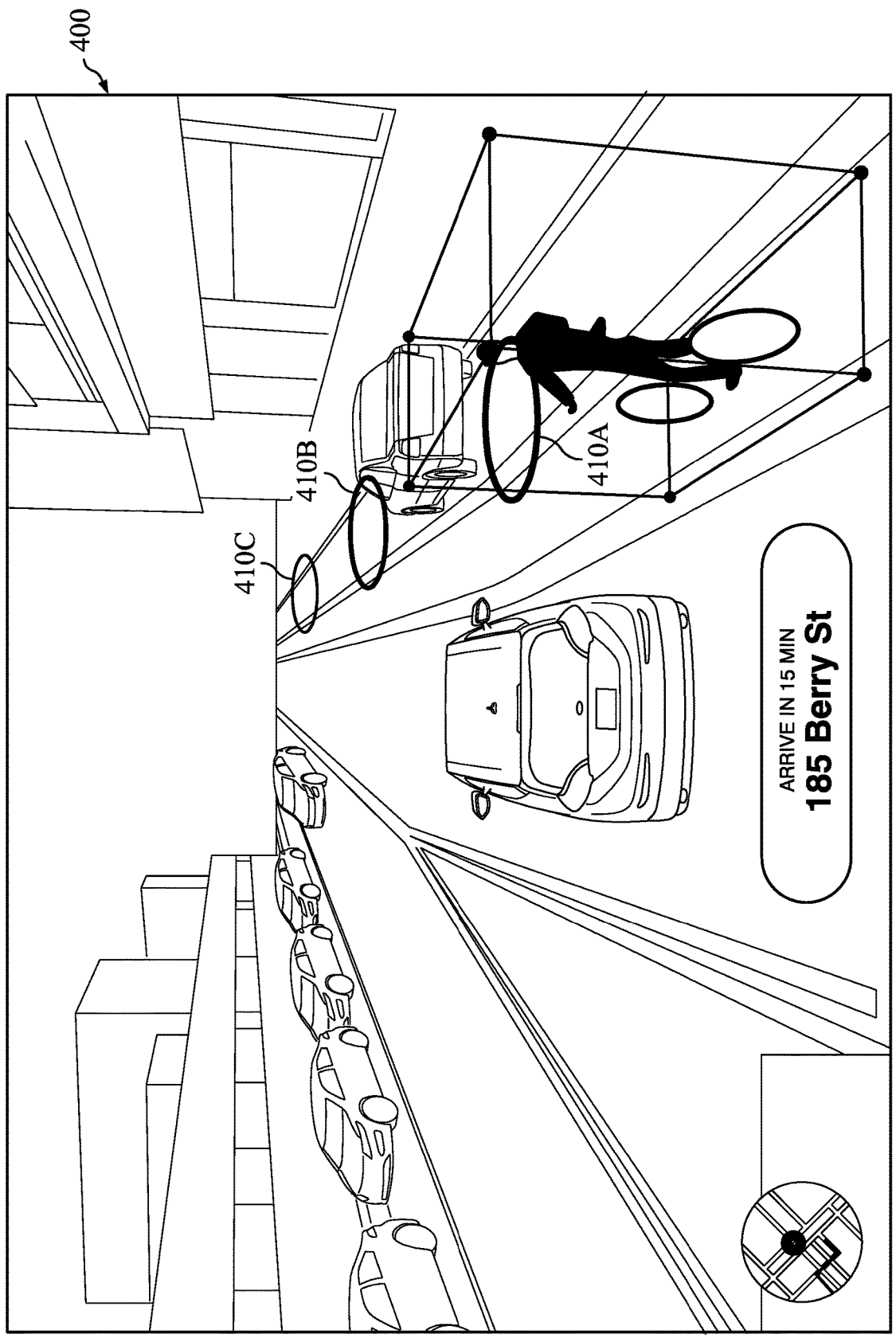
FIG. 4 illustrates another example graphical interface for displaying a real-time situational-awareness view associated with an autonomous ride.

A situational-awareness view may be a representation of an environment of the autonomous vehicle that is updated in real time. For example, FIGS. 3 and 4 show example situational-awareness views. In a situational-awareness view, graphical representations of objects that exist in the external environment of the autonomous vehicle may be displayed on the display screen of autonomous-vehicle UI device 148. As an example and not by way of limitation, autonomous vehicle 140 may be driving along a city street. Autonomous vehicle 140 may approach a traffic signal that changes from green, to yellow, to red. After the light changes to red, several pedestrians may cross the street in front of autonomous vehicle 140. Autonomous-vehicle UI device 148 may display a situational-awareness view that includes graphical representations of the traffic signal, the pedestrians, and any other objects (e.g. cars, street signs) within a threshold proximity of sensor array 144 (e.g. 100 meters). To render the situational-awareness view, one or more computing devices associated with autonomous vehicle 140 may use autonomous-vehicle sensor data, and in particular embodiments, secondary data such as map data in addition to the autonomous-vehicle sensor data. The map data may be obtained from a third-party system 170 or may be generated by the dynamic transportation matching system 160. The map data may be stored by the autonomous-vehicle UI device prior to a given ride and/or may be periodically updated for a neighborhood, city, region, etc. This may enable faster processing by the autonomous-vehicle UI device because there may not be a need to access a third-party system 170 during a given ride.

In particular embodiments, autonomous-vehicle UI device 148 may have an interactive touchscreen display and one or more other input/output (I/O) interfaces (e.g. a microphone). The display of autonomous-vehicle UI device 148 may be operable to receive rider input via a touchscreen in the form of taps on the touchscreen or via a microphone in the form of voice commands. Users 101 of the ride service may interface with autonomous-vehicle 140 by interfacing with autonomous-vehicle UI device 148 to obtain information (e.g. ETA, ride length, current location, nearby attractions), input commands to the autonomous vehicle (e.g. set a new destination, end the current ride, pick up another passenger, view information related to nearby attractions, view payment information), or perform any other suitable interaction. In particular embodiments, instead of using ride-service computing system 148 to view and interact with autonomous vehicle 140 or dynamic transportation matching system 160, the user may use their own user device 130. In particular embodiments, the situational-awareness view may be rendered on user device 130 as it is received from a computing device associated with autonomous vehicle 140 via a wired or wireless transmission such as Bluetooth or Wi-Fi. For example, a computing device of the autonomous vehicle may generate the situational-awareness view and may stream the generated view to the user device 130 over a wireless connection (e.g., Bluetooth, Wi-Fi, etc.).

Dynamic transportation matching system 160 may be accessed by the other components of network environment 100 either directly or via network 110. In particular embodiments, dynamic transportation matching system 160 may include an authorization server (or other suitable component(s)) that allows users 101 to opt in to or opt out of having their actions logged by dynamic transportation matching system 160 or shared with other systems (e.g. third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of dynamic transportation matching system 30 through blocking, data hashing, anonymization, or other suitable techniques as appropriate.

In particular embodiments, third-party system 170 may be a network-addressable computing system that can host GPS maps, customer reviews, weather information, or any other suitable type of information. Third-party system 170 may generate, store, receive, and send relevant data, such as, for example, map data, customer review data from a customer review website (e.g. YELP), weather data, or any other suitable type of data. Third-party system 170 may be accessed by the other components of network environment 100 either directly or via network 110. In particular embodiments, one or more users 101 may use one or more user devices 130 to access, send data to, and receive data from dynamic transportation matching system 160 or third-party system 170. User device 130 may access dynamic transportation matching system 160 or third-party system 170 directly, via network 110, or via a third-party system. As an example and not by way of limitation, user device 130 may access third-party system 170 via dynamic transportation matching system 160. User device 130 may be any suitable computing device, such as, for example, a personal computer, a laptop computer, a cellular telephone, a smartphone, a tablet computer, or an augmented/virtual reality device.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect user device 130, dynamic transportation matching system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
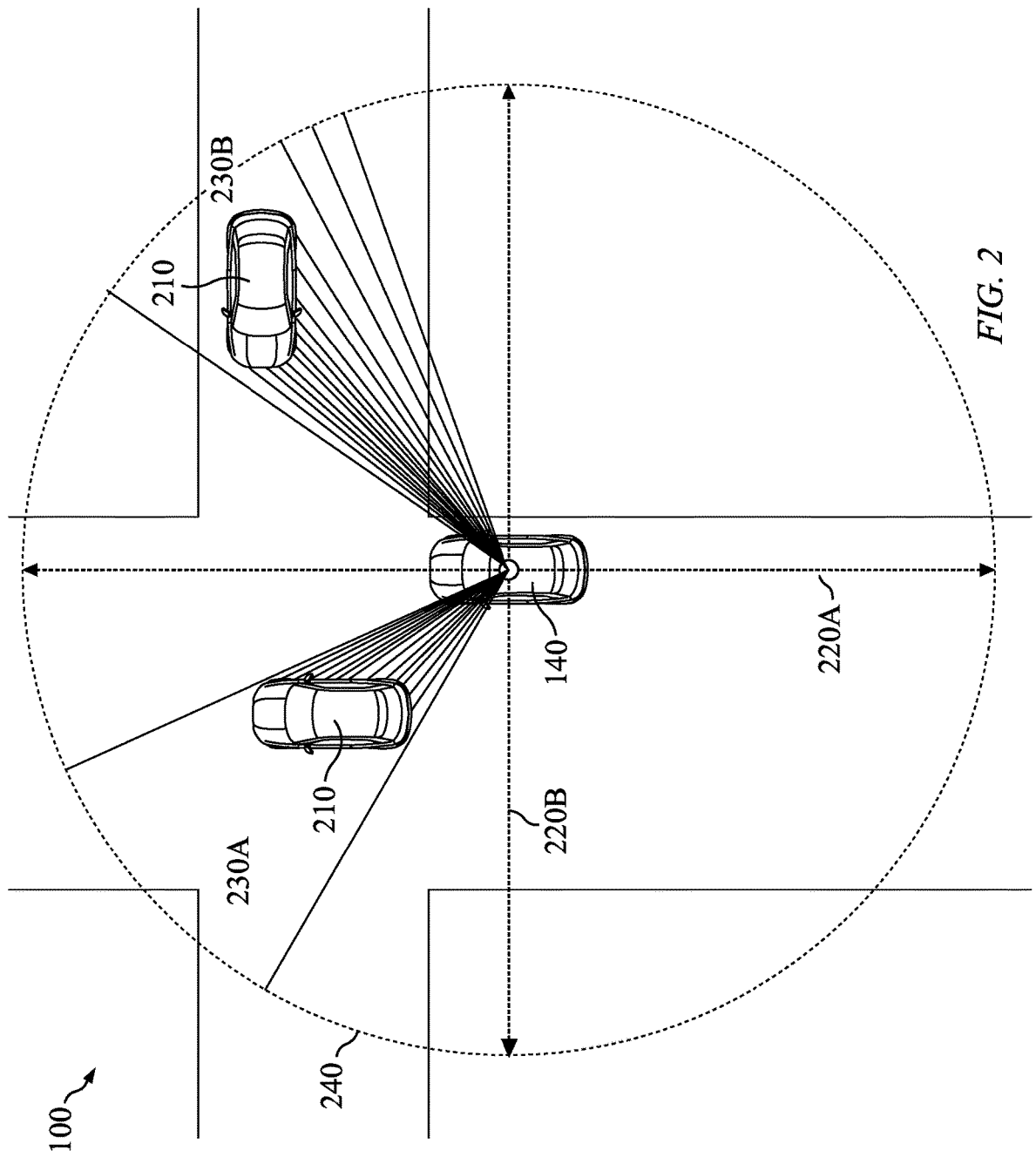
FIG. 2 illustrates an example driving environment of an example autonomous vehicle.

FIG. 2 illustrates an example driving environment of an example autonomous vehicle 140. In particular embodiments, a computing device associated with autonomous vehicle 140 or dynamic transportation matching system 160 may receive autonomous-vehicle sensor data that represents an external environment within a threshold distance of autonomous vehicle 140. In particular embodiments, the computing device may be autonomous-vehicle UI device 148, may be navigation system 146, or may be any other suitable computing device associated with autonomous vehicle 140. The autonomous-vehicle sensor data may be collected via sensors arranged on the outside or the inside of autonomous vehicle 140. The autonomous-vehicle sensor data may enable autonomous vehicle 140 to identify objects in the surrounding external environment, such as vehicles 210. The autonomous-vehicle sensor data may further enable autonomous vehicle 140 to identify the road upon which it is driving, lanes in the road, or any other suitable object.

As an example and not by way of limitation, the sensors on autonomous vehicle 140 may be LiDAR sensors. LiDAR systems may measure how far away a physical surface is in a 3D space is from the emitting device, as well as the direction to that surface, which allows for the creation of a full 3D model of the world around the sensor. The basic method of operation of a LiDAR system may be to transmit a beam of light, and then measure the returning signal when the light reflects off of an object. The time that the reflected signal takes to come back to the LiDAR module may provide a direct measurement of the distance to the object. Additional information about the object, like its velocity or material composition, may also be determined by measuring certain properties of the reflected signal, such as for example the induced Doppler shift. Finally, by steering or directing this transmitted light, many different points of an environment may be measured to create a full 3D model. The LiDAR sensors may transmit laser beams 230A and 230B in multiple directions around autonomous vehicle 140 within a distance 240, which may be the range of the sensors. As an example and not by way of limitation, the LiDAR sensors may transmit laser beams in any direction in a reference coordinate system having an x-direction 220A and a y-direction 220B. In particular embodiments, the reference coordinate system may also have a z-direction (not shown). Differences in laser return times and wavelengths may then be used to obtain coordinate information associated with the external environment of autonomous vehicle 140. In particular embodiments, the coordinate information may comprise distance information. The coordinate information may include a list of coordinate points (e.g. x, y, z coordinates) that represent locations where a LiDAR laser hit the surface of an object. In particular embodiments, based on the coordinate information, a three-dimensional representation may be generated for use by autonomous vehicle 140. In particular embodiments, the coordinate points may also comprise a time component t which may represent the time that a LiDAR beam was transmitted from the transceivers, hit an object, or was received by the transceivers. Autonomous vehicle 140 may use the time component of the coordinate points to determine a real-time three-dimensional representation of its external environment. In particular embodiments, autonomous vehicle 140 may combine the autonomous-vehicle sensor data with other types of data to detect roadways, buildings, traffic signs, and other objects. The other types of data may include data acquired from third parties. Examples of other types of data acquired from third parties include map data, traffic data, weather data, ratings data (e.g. from YELP or another third-party ratings entity) or any other suitable type of data.

In particular embodiments, the autonomous-vehicle sensor data may comprise one or more labeled point sets corresponding to objects in the external environment of autonomous vehicle 140. In this scenario, instead of receiving raw data points with x, y, and z components, the autonomous-vehicle sensor data may already be classified when it is received by the computing device. The data may come in "point sets," each point set corresponding to an identified object. As an example and not by way of limitation, a point set may include a list of data points with x, y, and z components, along with the label "car." Other labels for point sets may include, but are not limited to, pedestrian, truck, cyclist, tree, building, traffic signal, or any other suitable type of object.

FIG. 3 illustrates an example graphical interface 300 for displaying a real-time situational-awareness view associated with an autonomous ride. Graphical interface 300 may include a graphic representation of at least some of the autonomous-vehicle sensor data, historical data, and map data. The graphical interface may be displayed by the autonomous-vehicle UI device 148 or may be displayed by the user's user device 130. Graphical interface 300 may include several interactive and informational graphical elements that may help a passenger understand the autonomous-vehicle sensor data being gathered by sensors 144. Examples of informational graphical elements include graphics associated with stationary objects 320 (e.g. parked cars, traffic signals, mailboxes), graphics associated with moving objects 330, 310 (e.g. moving cars, bicyclists, runners), route indicator 350, street markings 380 (e.g. lanes indicators). In particular embodiments, objects may be further rendered with bounding box 311. Bounding box 311 may indicate to the user that the autonomous vehicle is aware of the object and its surrounding space. As an example and not by way of limitation, a bicyclist may be rendered in the graphical interface 300 has being within bounding box 311 to show that the autonomous vehicle 311 recognizes the object as a bicyclist. This may give the user an added measure of comfort to know that autonomous vehicle 140 is aware of both the object and a space immediately surrounding the object.

Examples of interactive graphical elements displayed in graphical interface 300 comprise a graphical rendering of autonomous vehicle 140, destination indicator interface element 360, and map toggle interface element 370. As an example and not by way of limitation, if the user taps on the graphical rendering of autonomous vehicle 140, information related to autonomous vehicle 140 may be displayed, such as the make, model, year, or autonomous vehicle 140, the battery or fuel level, the number of miles driven that day, week, month, or during the lifetime of autonomous vehicle 140, or any other suitable information. As another example and not by way of limitation, if the user taps on map toggle interface element 370, a larger-sized map may be displayed on the display screen. The user may then be able to interact with the map in any suitable manner. As another example and not by way of limitation, if the user taps on destination indicator interface element 360, information about the destination may be displayed. The user may be able to set a new destination, see information related to the destination, or view any other suitable information. In particular embodiments, every element in graphical interface 300 may be interactive. As an example and not by way of limitation, if the user taps on a rendering of a building 340, data related to that particular building may be displayed. If the building is a restaurant, autonomous-vehicle UI device 148 may access third-party data related to the restaurant and display the information, such as operating hours, customer reviews, current promotions, and other relevant information. As another example and not by way of limitation, if the user taps on a rendering of a pedestrian, the graphical interface may display limited information related to the pedestrian, such as its current distance from autonomous vehicle 140 and its current velocity.

FIG. 4 illustrates an example graphical interface 400 for displaying a real-time situational-awareness view associated with an autonomous ride. In particular embodiments, graphical interface 400 may provide a graphic representation of at least some of the autonomous-vehicle sensor data, historical data, and map data (e.g. at least some of the features and elements as those discussed above with regard to FIG. 3). Additionally, graphical interface 400 may include one or more graphical representations 410A, 410B, 410C of one or more potential pick-up or drop-off locations displayed as selectable icons. Graphical representations of the one or more potential pick-up or drop-off locations may take different forms than what is illustrated in FIG. 4, examples of different graphical representations may be to highlight the potential locations, use different shapes to indicate the different potential locations, use different colors to indicate the potential locations, or to use any other suitable mechanism to indicate the potential locations to the user.

When a user requests a ride from dynamic transportation matching system 160, autonomous vehicle 140 may navigate to the user. Prior to arrival, dynamic transportation matching system 160 may send to user device 130 instructions to display graphical interface 400 which may include graphical representations of potential pick-up locations. The user may select a pick-up location from among the potential pick-up locations. In response, autonomous vehicle 140 may navigate to the physical location that corresponds to the graphical representation of the pick-up location. If the user does not select any pick-up location, autonomous vehicle 140 may autonomously determine a pick-up location from available pick-up locations, as discussed below. During the ride and as autonomous vehicle 140 approaches a destination, graphical interface 400 may include graphical representations of potential drop-off locations as selectable icons. In particular embodiments, graphical user interface 400 may be displayed on autonomous-vehicle UI device 148, on user device 130, or on both autonomous-vehicle UI device 148 and user device 130 simultaneously. The user may select a drop-off location from among the graphical representations of the potential drop-off locations. Note that graphical representation 410C appears to be directly to the right of autonomous vehicle 140. If the user selects to be dropped off at the location represented by 410C, the autonomous vehicle 140 may need to drive in reverse for a brief period to navigate to that location (e.g., by parallel parking). The situational view may display graphical representations of available pick-up or drop-off locations such as 410C only if it is safe and legal for the autonomous vehicle to perform the functions necessary to navigate to the location.

If the user does not select any drop-off location, the autonomous vehicle may determine a pick-up location from available pick-up locations, as discussed below. As the autonomous vehicle nears the destination, route indicator 350 may be removed from the graphical interface. Alternatively, route indicator 350 may stop in the middle of the street in front of the destination. As another alternative, route indicator 350 may be displayed as going toward one of the graphical representations 410A, 410B, 410C that represent potential drop-off locations. For example, if the computing device selects 410B as the drop-off location (as explained below), route indicator 350 may be displayed as going toward graphical representation 410B. Then, if the user selects a different drop-off location (e.g., 410C), route indicator 350 may change and show the route as going toward graphical representation 410C.

Figure 5:
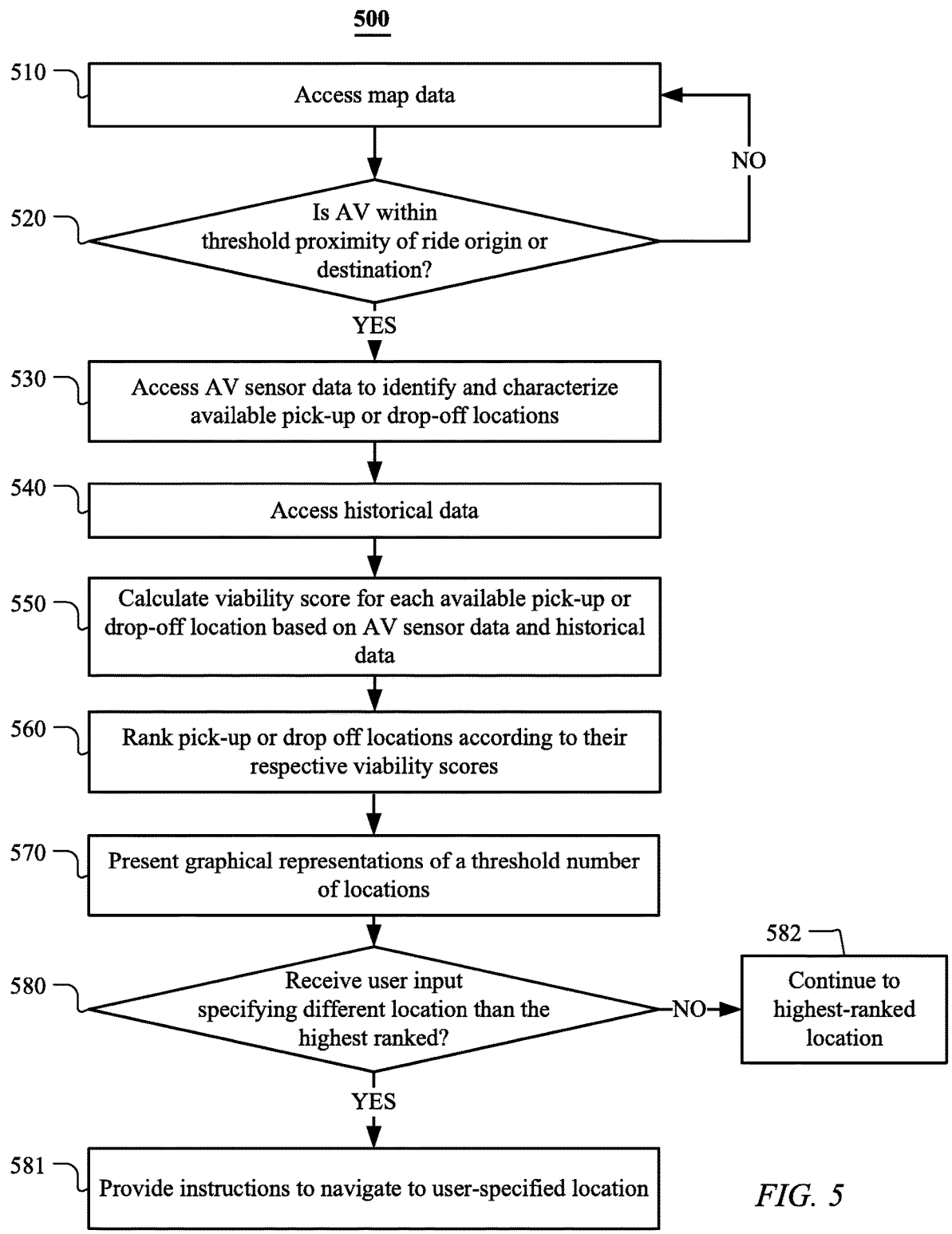
FIG. 5 illustrates an example method for determining a pick-up or drop-off location for a user and presenting potential pick-up or drop-off locations in a real-time situational-awareness view.

FIG. 5 illustrates an example method 500 for determining a pick-up or drop-off location for a user and presenting potential pick-up or drop-off locations in a real-time situational-awareness view. Method 500 may occur in the context of providing a ride to a requestor (e.g., user) and generally (though not necessarily) at the beginning or end of the ride. Method 500 begins at step 510, where a computing device associated with the dynamic transportation matching system (for example, autonomous-vehicle UI device 148) accesses map data associated with the external environment of the autonomous vehicle. The map data may be accessed from dynamic transportation matching system 160. In addition or as an alternative, the map data may be accessed from one or more third-party map services, such as MAPQUEST, GOOGLE MAPS, or DEEPMAP. In addition or as an alternative, the map data may be accessed from a cache of map data maintained by the computing device (which may have previously been accessed from ride-service system 160 or one or more third-party map services). The map data may include satellite imagery, one or more street maps, one or more 360° panoramic views of streets, traffic conditions of an area around the autonomous vehicle, or any other suitable map data. The map data may provide information about street names and street locations. Autonomous vehicle 140 or the computing device (e.g. autonomous-vehicle UI device 148) may use the map data to determine a general current location of the autonomous vehicle 140 and/or a location of the autonomous vehicle in relation to a request location and/or destination location for a ride or ride request.

At step 520, the computing device determines whether the autonomous vehicle is within a threshold proximity of a current path of a current ride of the autonomous vehicle. The current path may include the ride origin or the ride destination. The ride origin may be the location where the autonomous vehicle picks up the requestor. In particular embodiments, the ride origin is an address associated with the requestor. In particular embodiments, the ride origin includes GPS coordinates of the client device 130 associated with the requestor, a request location entered into a requestor device, and/or may be identified based on historical ride information associated with the requestor (e.g., a recurring location known to the requestor). The ride destination may be the destination (e.g., address) specified by the requestor. To be within a threshold proximity, the autonomous vehicle may need to be within a predetermined number of feet, yards, miles, or any other relevant distance measurement from the origin or destination location. If this is the case, then the method may proceed to step 530. If not, the method may repeat step 510 until the condition of step 520 is satisfied.

At step 530, the computing device accesses autonomous-vehicle sensor data to identify and characterize available pick-up or drop-off locations, depending on whether the ride is at the beginning or the end. The autonomous-vehicle sensor data may represent an external environment around the autonomous vehicle. The autonomous-vehicle sensor data may be accessed from sensor array 144 and may include a list coordinate points representing surface points of objects detected by sensors 144, as discussed above. In addition or as an alternative, the autonomous-vehicle sensor data may include one or more classified point sets corresponding to the coordinate points, as described above.

The computing device may also identify and characterize locations at step 530. Identifying the locations may involve processing the autonomous-vehicle sensor data to determine the location of each object within a threshold distance of the autonomous vehicle (e.g., 100 feet) and then determining the locations and size of the negative spaces (e.g., the space between objects) inside a space parameter. The space parameter may indicate a space on (or off) the road where vehicles may safely or legally stop. For example, a location along the shoulder of a road may be inside the space parameter, but a location in the middle of a highway lane may be outside the space parameter. As another example, a location in a fire lane may be outside the space parameter, but a location within a bike lane may be inside the space parameter, since it may be illegal to stop in a fire lane but legal to stop in a bike lane. Any location of negative space inside the space parameter that is larger than the footprint of the autonomous vehicle (plus some buffer distance on all sides) may qualify as an available location for pick-up or drop-off. As an example and not by way of limitation, the autonomous-vehicle sensor data may indicate that there are three stationary objects within the space parameter along the side of a road. The distance between the first object and the second object may be a first negative space (e.g., empty space that is not occupied by any objects) that is 16 feet long. This may be a few inches shorter than the length of the autonomous vehicle. The distance between the second object and the third object may be a second negative space that is 20 feet long. This may be 3 feet and 8 inches longer than the length of the autonomous vehicle. The 3 feet and 8 inches may be greater than the buffer distance (e.g., 6 inches). Thus, the computing device may determine that the first negative space is not available for pick-up or drop-off because it is too small but that the second negative space is available. Thus, the computing device may identify the second negative space as an available location.

Characterizing available locations may involve, for each available location, determining and recording various factors about the location such as the size of the location, the lighting of the location, the amount of traffic (pedestrian or vehicular) around the location, the distance between the location and the destination, or any other suitable data that affect the suitability of the location for a drop-off or pick-up. The computing device may record this information in association with each available location and use the information when calculating a viability score for each available location, as will be described below. As an example and not by way of limitation, a first available drop-off location may have several objects (e.g. cars, pedestrians) close to it and a second available drop-off location may have relatively few objects nearby. Based on this, the computing device may decrease a characterization score for the first location and increase a characterization score for the second location, as discussed below.

At step 540, the computing device accesses historical data. The historical data may include several location references that each indicate a past pick-up or drop-off location for one or more past users of a ride service within a particular threshold distance of the origin or destination. Many users being dropped off at a particular location may be a signal that the particular location is a suitable location for drop-off or pick-up. The computing device may access user specific or aggregate historical data for use in a current ride. The historical data may be accessed from dynamic transportation matching system 160. In addition or as an alternative, the historical data may be accessed from a cache of historical data maintained by the computing device (some of which may have previously been accessed from dynamic transportation matching system 160). In particular embodiments, the historical data may indicate previous pick-up and drop-off locations of the current user or other users, along with historical location features of each location. The historical location features include the times of the pick-ups and drop-offs at those locations and the number, frequency, or percentage of pick-ups and drop-offs at those locations and times of total pick-ups and drop-offs for the area associated with the origin or drop-off. The area associated with the origin or drop-off of a ride may be an address of the origin or drop-off, an circular area with the origin or destination address or coordinate points as the center of the circle and a threshold proximity as its radius, or any other suitable area. The computing device may record the historical data in association with each available location and use the historical data when calculating a viability score for each available location, as described below.

As an example of historical data and not by way of limitation, dynamic transportation matching system 160 may have facilitated 1,000 rides for users to travel from the San Francisco Airport to a hotel located in downtown San Francisco. For each of these 1,000 rides, dynamic transportation matching system 160 may record the pick-up location and the drop-off location, along with other relevant information (e.g. the route used, traffic data, road blocks, the ride rating, information related to the user). This information may be referred to as historical data. From the historical data the computing device may determine one or more historical pick-up or drop-off locations. A historical pick-up or drop-off location may be a particular location that has been used as a pick-up or drop-off location for a threshold number of rides or a threshold number of users. As another example and not by way of limitation, dynamic transportation matching system 160 may have facilitated 25 rides for a single user. That user may request another ride from dynamic transportation matching system 160. Dynamic transportation matching system 160 (e.g. via the computing device) may access historical data for that particular user, which may include information associated with the 25 rides that the user has previously taken with dynamic transportation matching system 160. The historical data may indicate that when the user requests a ride from a particular location (e.g., an office building where he works) the user has most often been picked-up at a particular street corner near the office building. The computing device may take this information into account when determining a suitable pick-up location for the user, as discussed below. As another example and not by way of limitation, a threshold number or proportion of users (e.g. 100 users, 40% of users with a common destination) may have been dropped off 35 feet from the northeast corner of the block on which 185 Berry Street is located. The computing device may take this information into account when calculating a viability score for an available location located 35 feet from the northeast corner of that block.

At step 550, the computing device calculates a viability score for each available location. The viability score may represent the feasibility of dropping off or picking up a user at the location. The viability score may be based on the autonomous-vehicle sensor data and the historical data and may be determined using a suitable algorithm. As an example and not by way of limitation, the viability score may be based on a weighted composite of a characterization score and a historical score, such as $VS=(CS)w+HS(v)$, where VS is the viability score, CS is the characterization score, and HS is the historical score. The variables w, v may be weighting values assigned to CS and HS, respectively. The value of variables w, v may depend on how important HS and CS are to determining the viability score. For example, it may be more important to find a location that is large enough, well lit, free of traffic, and close to the destination than it is to find a historically popular location. Thus, w may receive a value of e.g., 0.50 and v may receive a value of e.g., 0.35. The above discussion merely provides an example of one way to determine the feasibility of dropping off or picking up a user at a particular location. Any other suitable algorithm based on any suitable factors may be used. For example, historical ride history, safety of a location, and other factors may be incorporated to evaluate and score potential locations.

The characterization score CS may represent the suitability of a potential pick-up or drop-off location based on physical characteristics of the potential pick-up or drop-off location (e.g., size, lighting, amount of surrounding traffic, proximity to destination or origin). The characterization score CS may be calculated using any suitable algorithm, for example, $CS = Ax + By + \ldots + Cz$. The variables A, B, ... C may provide binary indications (e.g., "1" or "0") of whether various statements related to the locations are true. As an example and not by way of limitation, A may indicate whether the location size is at least the size of the footprint of the autonomous vehicle plus two feet of buffer room. If yes, A may be assigned "1." If no, A may be assigned "0." As another example, B may indicate whether the lighting at the location is above 2,000 lumens. If yes B may be assigned "1." If no, B may be assigned "0." As another example, C may indicate whether the location is within 50 feet from the destination. If yes, C may be assigned "1." If no, C may be assigned "0." The variables x, y, z may be weighting variables, assigned to A, B, ... C, respectively. Their values may depend on how important each of the factors A, B, ... C are to determining the characterization of the location. For example, the size of the location may be more important than the lighting at the location. Thus, x may receive a weight of 0.50 and y may receive a weight of 0.35. Determining the values of the weights may be performed by an administrator of the dynamic transportation matching system or by a machine-learning algorithm associated with the dynamic transportation matching system, or by any other suitable method.

Calculating the historical score HS may be done in an analogous manner to calculating the characterization score CS. The historical score may use a similar algorithm, such as $HS = Ax + By + \ldots + Cz$. Here, the variables A, B, ... C may provide binary indications (e.g., "1" or "0") of whether various statements related to the historical data with regard to the location are true. For example, A may indicate whether a threshold number of passengers were dropped off at the location during a time window corresponding to the current time of drop-off (e.g., a 7:00 PM to 8:00 PM time window if the autonomous vehicle will drop off a passenger at 7:19 PM). B may indicate whether a threshold percentage of passengers were dropped off at the location out of all the locations within a specified geographic proximity (e.g., 25% of all drop-offs within 100 meters in all directions occur at the location). C may indicate whether a threshold frequency of passengers have been dropped off at the location during the time window (e.g., at least seven passengers per hour at the location during the time window). The variables x, y, ... z may be weighting variables, assigned to A, B, ... C, respectively. Their values may depend on how important each of the factors A, B, ... C are to determining the how "popular" a particular location has historically been. For example, the size of the location may be more important than the lighting at the location. Thus, x may receive a weight of 0.50 and y may receive a weight of 0.35. Determining the values of the weights may be performed by an administrator of the dynamic transportation matching system or by a machine-learning algorithm associated with the dynamic transportation matching system, or by any other suitable method.

In particular embodiments, the variables A, B, ... C need not be binary. They may be any suitable value. As an example of how the computing device may use historical data and non-binary values, the computing device may identify two available drop-off locations that are associated with a threshold number of past users who have used each of these locations for pick-up or drop-off. However, the first of the two potential drop-off locations may have been used by 150 users and the second available drop-off location may have been used by 100 users. The computing device may assign the variable for the first location a value of 1.5 and may assign the variable for the second location a value of 1.0, to reflect the difference in historical popularity between the two locations.

At step 560, the computing device ranks the scored locations according to their respective viability scores, with the higher scoring locations ranked above the lower scoring locations. Also at step 560, though not illustrated by FIG. 5, the computing device may provide for display on the autonomous-vehicle UI device the situational-awareness view that includes a visual representation of the pick-up or drop-off locations whose score is above a threshold score. Alternatively, the situational-awareness view may display the top N-scoring pick-up or drop-off locations (e.g., 3 locations).

At step 570, the computing device may provide instructions to present graphical representations of a threshold number of locations as an overlay graphic on the situational-awareness view. These graphical representations may resemble the example graphical representations 410A, 410B, 410C of FIG. 4. At step 580, the computing device may determine if it has received user input specifying a different location than the highest ranked location or otherwise selected location. If it has received user input specifying a different location, the computing device may proceed to step 581 and provide instructions to navigate to the user-specified location.

If it has not received such user input, the computing device may proceed to step 582 and continue to navigate to the highest ranked or otherwise selected location. The user input may come in the form of a user selection via the autonomous-vehicle UI device or the user's own client device when the user taps or presses on a particular graphical representation of a pick-up or drop-off location. As an example, consider the following with reference to FIG. 4. The computing device may determine several drop-off locations for a passenger. The three highest-ranked locations may correspond to graphical representations 410A, 410B, and 410C. 410B may have the highest viability score, so the computing device may select the location corresponding to 410B and provide instructions to the autonomous vehicle to navigate to that location. At some point either before, after, or simultaneously with the above decision and provision of instructions, the computing device may also provide instructions to display graphical representations 410A, 410B, and 410C in the situational-awareness view 400. In this example, the user may select to be dropped-off at the location corresponding to 410C by tapping or otherwise selecting that icon on the display screen. In response, the computing device may provide instructions to navigate to the location associated with 410C instead of 410B. In particular embodiments, the graphical representations may be different for each potential location based on their viability scores. For example, potential locations with higher viability scores may be represented by larger graphical representations than potential locations with lower viability scores. As another example, the potential location with the best score may be indicated by a graphical indicator, such as a star, diamond, color that is different from the other graphical representations, or any other suitable means.

At step 582, the computing device provides instructions to navigate to the highest-ranked location, as this location is likely a suitable location to drop-off or pick-up a passenger. Alternatively, the computing device may provide instructions to navigate to another location whose viability score is above a threshold score. The reason for this may be any suitable reason, such as a promotion and partnership with a nearby business may cause the computing device to provide instructions to drop-off or pick-up a passenger near the business so that the passenger may see the business and be more likely to purchase its goods or services. In particular embodiments, the computing device may be autonomous-vehicle UI device 148. In this case, autonomous-vehicle UI device 148 may send instructions to navigation system 146. In particular embodiments, the computing device may be navigation system 146. In this case, navigation system 146 may send the instructions to autonomous vehicle 140. In particular embodiments, the computing device may be any suitable computing device associated with autonomous vehicle 140.

Particular embodiments may repeat one or more steps of the methods of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for selecting a pick-up or drop-off location for a user of a ride service including the particular steps of the method of FIG. 5, this disclosure contemplates any suitable method for selecting a pick-up or drop-off location for a user of a ride service including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
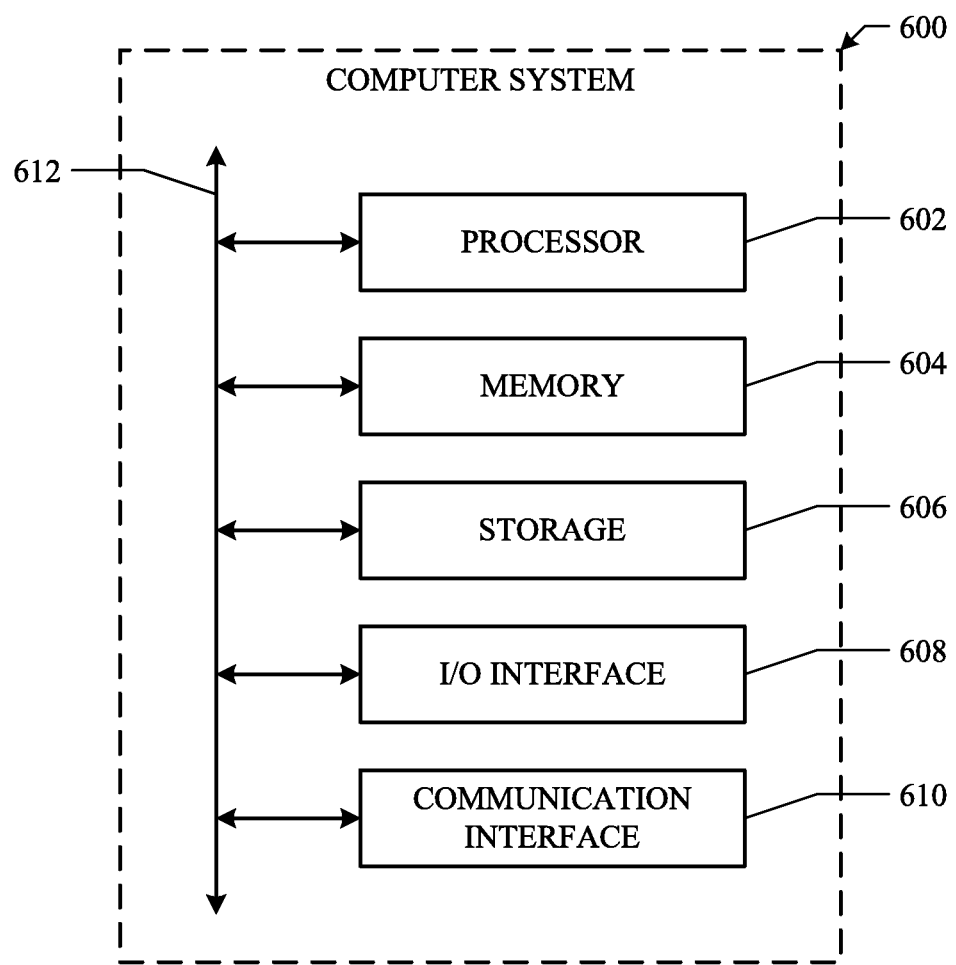
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache.

Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described in further detail below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising, by a computing system:
    sending a set of instructions to present, on a computing device, one or more available locations for a vehicle to pick-up or drop-off a user in an area, wherein the one or more available locations are based on sensor data of the area that is captured by the vehicle, and that corresponds to physical characteristics of the area that are associated with suitability of the area for the vehicle to pick-up or drop-off the user;
    receiving, from the computing device, selection by the user of a location associated with the area for the vehicle to pick-up or drop-off the user;
    adjusting a viability value of one or more locations to pick-up or drop-off the user in the area, wherein the viability value is calculated based on the physical characteristics of the area as determined from the sensor data, and the viability value is adjusted based at least on the selected location;
    based on the adjusted viability value of the one or more locations, determining a location from the one or more locations for the vehicle to pick-up or drop-off the user in the area; and
    instructing the vehicle to travel to the determined location.

2. The method of claim 1, wherein the one or more locations to pick-up or drop-off the user includes at least the selected location and the one or more available locations, and wherein the viability value of the one or more locations is further adjusted based on the one or more available locations.

3. The method of claim 1, further comprising:
    determining the one or more available locations for the vehicle to pick-up or drop-off the user based on a characterization score that represents suitability of each of the one or more available locations based on physical characteristics of each of the one or more available locations.

4. The method of claim 1, further comprising:
    determining the one or more available locations for the vehicle to pick-up or drop-off the user based on historical data including previous pick-up or drop-off events in the area.

5. The method of claim 1, further comprising determining the one or more available locations by:
    identifying physical spaces in the area as candidate locations;
    characterizing the candidate locations; and
    ranking the candidate locations according to the characterization.

6. The method of claim 1, further comprising:
    sending an additional set of instructions to present, on the computing device, the determined location for the vehicle to pick-up or drop-off the user in the area.

7. The method of claim 6, wherein the one or more available locations for the vehicle to pick-up or drop-off the user in the area are presented on the computing device after the vehicle is within a threshold proximity to the area.

8. The method of claim 1, wherein the determined location includes the selected location received from the computing device or is different from the selected location received from the computing device.

9. The method of claim 1, wherein instructing the vehicle to travel to the determined location comprises generating a route from a current location of the vehicle to the determined location.

10. The method of claim 1, further comprising:
    adjusting a ranking of the one or more locations by adjusting the viability value of the one or more locations based on the selection by the user.

11. The method of claim 10, wherein the location has a highest ranking among the one or more locations to pick-up or drop-off the user.

12. The method of claim 1, wherein the computing device is integrated into the vehicle or the computing device is associated with the user.

13. The method of claim 1, wherein the one or more available locations presented on the computing device satisfy a viability threshold score.

14. The method of claim 1, wherein the physical characteristics are based at least in part on a size of the one or more available locations, a lighting measurement of the one or more available locations, a distance between the one or more available locations and an origin associated with a current ride, or a distance between the one or more available locations and a destination associated with a current ride.

15. A system comprising: one or more processors; and one or more computer-readable non-transitory storage media in communication with the one or more processors and comprising instructions, that when executed by the one or more processors, are configured to cause the system to perform operations comprising:
    sending a set of instructions to present, on a computing device, one or more available locations for a vehicle to pick-up or drop-off a user in an area, wherein the one or more available locations are based on sensor data of the area that is captured by the vehicle, and that corresponds to physical characteristics of the area that are associated with suitability of the area for the vehicle to pick-up or drop-off the user;

receiving, from the computing device, selection by the user of a location associated with the area for the vehicle to pick-up or drop-off the user;

adjusting a viability value of one or more locations to pick-up or drop-off the user in the area, wherein the viability value is calculated based on the physical characteristics of the area as determined from the sensor data, and the viability value is adjusted based at least on the selected location;

based on the adjusted viability value of the one or more locations, determining a location from the one or more locations for the vehicle to pick-up or drop-off the user in the area; and instructing the vehicle to travel to the determined location.

16. The system of claim 15, wherein the one or more locations to pick-up or drop-off the user includes at least the selected location and the one or more available locations, and wherein the viability value of the one or more locations is further adjusted based on the one or more available locations.

17. The system of claim 15, wherein the instructions are further configured to cause the system to perform operations further comprising:

determining the one or more available locations for the vehicle to pick-up or drop-off the user based on a characterization score that represents suitability of each of the one or more available locations based on physical characteristics of each of the one or more available locations.

18. The system of claim 15, wherein the instructions are further configured to cause the system to perform operations further comprising:

determining the one or more available locations for the vehicle to pick-up or drop-off the user based on historical data including previous pick-up or drop-off events in the area.

19. One or more computer-readable non-transitory storage media including instructions that, when executed by one or more processors of a computing system, are configured to cause the one or more processors to perform operations comprising:

sending a set of instructions to present, on a computing device, one or more available locations for a vehicle to pick-up or drop-off a user in an area, wherein the one or more available locations are based on sensor data of the area that is captured by the vehicle, and that corresponds to physical characteristics of the area that are associated with suitability of the area for the vehicle to pick-up or drop-off the user;

receiving, from the computing device, selection by the user of a location associated with the area for the vehicle to pick-up or drop-off the user;

adjusting a viability value of one or more locations to pick-up or drop-off the user in the area, wherein the viability value is calculated based on the physical characteristics of the area as determined from the sensor data, and the viability value is adjusted based at least on the selected location;

based on the adjusted viability value of the one or more locations, determining a location from the one or more locations for the vehicle to pick-up or drop-off the user in the area; and instructing the vehicle to travel to the determined location.

20. The one or more computer-readable non-transitory storage media of claim 19, wherein the one or more locations to pick-up or drop-off the user includes at least the selected location and the one or more available locations, and wherein the viability value of the one or more locations is further adjusted based on the one or more available locations.

* * * * *